United States Patent [19]

Krishnamurthy et al.

[11] Patent Number: 4,963,339
[45] Date of Patent: Oct. 16, 1990

[54] HYDROGEN AND CARBON DIOXIDE COPRODUCTION

[75] Inventors: Ramachandran Krishnamurthy, Piscataway; Virginia A. Malik, Linden, both of N.J.; Alan G. Stokley, Wokingham, England

[73] Assignee: The BOC Group, Inc., New Providence, N.J.

[21] Appl. No.: 190,281

[22] Filed: May 4, 1988

[51] Int. Cl.$^5$ .................. B01D 53/04; C01B 3/24; C01B 31/20

[52] U.S. Cl. ..................... 423/437; 55/26; 55/62; 55/68; 422/190; 422/198; 423/650

[58] Field of Search .............. 62/18; 423/650, 437; 55/26, 62, 68

[56] References Cited

U.S. PATENT DOCUMENTS

| | | | |
|---|---|---|---|
| Re. 31,014 | 7/1982 | Sircar | 55/26 |
| 2,477,738 | 8/1949 | Getz | 62/18 |
| 3,643,451 | 2/1972 | Foucar | 62/28 |
| 4,460,395 | 7/1984 | Nobles et al. | 62/18 |
| 4,726,816 | 2/1988 | Fuderer | |
| 4,778,670 | 10/1988 | Pinto | 423/650 |
| 4,869,894 | 9/1989 | Wang et al. | 55/26 |

FOREIGN PATENT DOCUMENTS 0178833 4/1986 European Pat. Off. .
0262894 6/1988 European Pat. Off. .
2911669 10/1980 Fed. Rep. of Germany .

OTHER PUBLICATIONS

Kirk–Othmer, *Encyclopedia of Chemical Technology*, Third Edition, vol. 4, John Wiley & Sons (1978) pp. 725, 737, 738.

*Primary Examiner*—Wayne A. Langel
*Attorney, Agent, or Firm*—Carol A. Nemetz; Robert I. Pearlman

[57] ABSTRACT

Highly purified gaseous hydrogen and liquid carbon dioxide are produced from a steam reformer/shift converter by passing the effluent from the latter through a multibed hydrogen PSA unit followed by an uncoupled carbon dioxide PSA unit. The carbon dioxide PSA unit produces a hydrogen-rich stream which is recycled to the feed to the steam reformer, a carbon dioxide-rich recycle stream which is recycled to the carbon dioxide PSA unit feed and a carbon dioxide-rich product stream which is introduced under pressure to a liquifier. A waste stream from the liquifier is recylced to the carbon dioxide PSA unit feed. A portion of the carbon dioxide-rich product stream is withdrawn from the compressor at a stage such that its pressure is higher than that of the carbon dioxide PSA unit and returned thereto as a cocurrent purge preceding bed regeneration to obtain product.

9 Claims, 2 Drawing Sheets

HYDROGEN AND CARBON DIOXIDE COPRODUCTION

This invention relates to the production of high purity gaseous hydrogen and liquid carbon dioxide from a gas mixture containing them, particularly a hydrocarbon steam reformer exit gas.

BACKGROUND OF THE INVENTION

The production of hydrogen by the steam reforming of hydrocarbons is well known. In the basic process, a hydrocarbon, or a mixture of hydrocarbons, is initially treated to remove trace contaminants, such as sulfur and olefins, which would adversely affect the reformer catalyst. Methane is a preferred starting material since it has a higher proportion of hydrogen than other hydrocarbons. However, $C_{3-4}$ hydrocarbons or others readily available might be utilized as well, although they are primarily converted to methane in the furnace. Since the object is the production of hydrogen, saturated hydrocarbons, i.e. alkanes, are preferred source materials.

The pretreated hydrocarbon is typically compressed, e.g. to about 200 to 400 psig, and combined with high pressure steam, which is at about 700 psig, before entering the reformer furnace. The reformer itself conventionally contains tubes packed with catalyst through which the steam/hydrocarbon mixture passes. An elevated temperature, e.g. about 860° C. is maintained to drive the reaction which is endothermic.

The effluent from the reformer furnace is principally hydrogen, carbon monoxide and carbon dioxide in proportion close to equilibrium amounts at the furnace temperature and pressure with a minor amount of methane. The effluent is conventionally introduced into a one- or two-stage shift reactor to form additional hydrogen and carbon dioxide. The shift reactor converts the carbon monoxide to carbon dioxide with the liberation of additional hydrogen by reaction at high temperature in the presence of steam. The combination of hydrogen steam reformer and shift converter is well known to those of ordinary skill in the art.

There have been proposed a number of schemes for treating the effluent from the shift converter to recover hydrogen and carbon dioxide therefrom. As yet, none of these variations has attained maximum efficiency.

In one such method, the shift converter effluent, which comprises hydrogen, carbon dioxide and water with minor quantities of methane and carbon monoxide is introduced into a conventional absorption unit for carbon dioxide. Such a unit operates on the well-known amine wash or Benfield processes wherein carbon dioxide is removed from the effluent by dissolution in an absorbent solution, i.e. an amine solution or potassium carbonate solution, respectively Conventionally, such units remove about 95 percent of the carbon dioxide in the shift converter effluent.

The effluent from the carbon dioxide absorption unit is introduced into a pressure swing adsorption (PSA) unit. PSA is a well-known process for separating the components of a mixture of gases as a result of the difference in the degree of adsorption among them on a particulate adsorbent retained in a stationary bed. Typically, two or more such beds are operated in a cyclic process comprising adsorption under pressure and desorption under comparatively lower pressure or vacuum. The desired component or components of the gas mixture can be obtained during either of these stages The cycle may contain other steps in addition to the fundamental steps of adsorption and regeneration, and it is commonplace where such a unit contains more than two adsorbent beds to have two beds cycled 180° out of phase, thereby providing a psuedo-continuous flow of desired product.

Conventionally, the effluent from the PSA unit, which comprises carbon monoxide, the hydrocarbon, i.e. methane, hydrogen and carbon dioxide, is returned to the steam reformer and combusted to obtain energy for use therein. There are several disadvantages to this process. First and foremost, the hydrogen which is not removed in the PSA unit, typically about 25 percent, is not recovered, but is lost in the recycle gas which is combusted in the steam reformer. There is unavoidably some loss of hydrogen in the absorber unit due to dissolution thereof in the absorber solution. The combined losses in hydrogen can amount to as much as 40 percent and are generally in the range of 20 to 40 percent. It will be appreciated that these percentages are approximations and can vary depending on the efficiencies of the PSA unit. In addition, the absorber/stripper unit has a significant capital and operating cost which must be factored into the process. There is also carryover of the absorber solution in the effluent to the PSA unit which represents a source of impurity necessitating a pretreatment step for its removal. Finally, the carbon dioxide product of such a process is not of high purity, i.e. not food grade.

In an alternative process disclosed in Sircar, U.S. Pat. No. Re. 31,014, reissued Aug. 17, 1982, the effluent from the shift converter is passed through a complex two-stage PSA unit wherein high purity hydrogen is recovered from the second PSA stage and high purity carbon dioxide is recovered from the first PSA stage during vacuum regeneration. This system is disadvantageous in that, during the production cycle, i.e. the adsorption step, feed flows through both stages concurrently, whereby any ingress of air into the first stage will pass through to the second stage. The oxygen that does not adsorb onto the adsorbent contained therein will pass through and contaminate the hydrogen, a problem if it is desired to prepare merchant grade (99.999 percent purity) hydrogen. Although the product purities of this process are high, they do not meet merchant grade specifications. Operation of the process to produce merchant grade product would significantly decrease product recoveries. Further, this process, like that described above, contemplates return and combustion of the PSA effluent in the steam reformer.

Although the above-described process provides a means of obtaining high purity carbon dioxide and hydrogen from a steam reformer effluent or similar gas mixture, there is considerable room for improvement in quantity and purity of products recovered. Such an improvement is provided in accordance with the present invention.

SUMMARY OF THE INVENTION

The gaseous effluent from a hydrocarbon steam reformer is passed through a conventional shift converter and cooled to ambient temperature. After removal of water, the resulting saturated gas mixture is introduced into a four-bed hydrogen PSA unit to produce high purity hydrogen, i.e. at least 99.999 percent pure. The hydrogen PSA unit effluent is dried and introduced into a carbon dioxide PSA unit which forms a carbon dioxide-rich recycle stream, a carbon dioxide-rich product stream and a hydrogen-rich stream. The carbon dioxide recycle stream is combined with the feed to the carbon dioxide PSA unit. The carbon dioxide product stream is liquified in a distillation column to obtain high purity liquid carbon dioxide and a vapor stream which is recycled to the carbon dioxide PSA feed to provide maximum recovery of high purity carbon dioxide. A portion of the carbon dioxide product stream is utilized in the PSA unit as a cocurrent purge at a pressure preferably above the operating pressure of the carbon dioxide PSA unit to obtain a product of higher purity. The hydrogen-rich stream from the carbon dioxide PSA unit is recycled to the feed to the steam reformer thereby providing maximum recovery of the hydrogen.

DESCRIPTION OF THE PREFERRED EMBODIMENT

Figure 1:
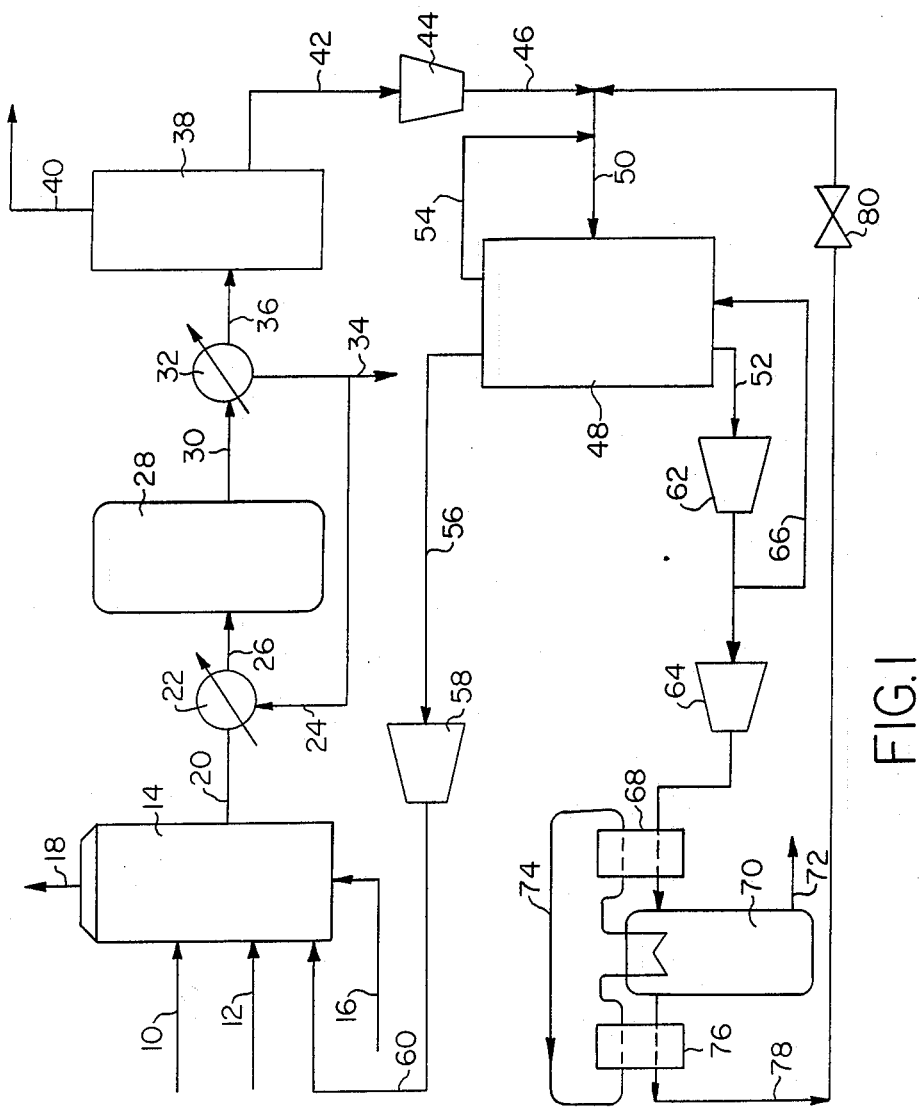
FIG. 1 is a schematic diagram of a process for the coproduction of gaseous hydrogen and liquid carbon dioxide according to the present invention.

Referring to FIG. 1, steam and a source hydrocarbon are introduced through lines 10 and 12, respectively, into a conventional steam reformer 14. Fuel for combustion in the steam reformer 14 is introduced through line 16. Stack gases from the combustion are vented through pipe 18.

The gaseous effluent from the steam reformer 14 is introduced through line 20 to a quench pot 22 where it is cooled by water recirculating from a condensate-drain vessel, as will be discussed. The recirculating water is introduced through line 24. The effluent from the quench pot 22 is introduced through line 26 into a conventional shift converter 28. In shift converter 28, carbon monoxide and steam in the reformer effluent react in the presence of a catalyst to form additional hydrogen and carbon dioxide.

The effluent from the shift converter 28 is introduced by line 30 into a cooler and condensate drain 32 wherein a substantial amount of the water therein is removed. The water that is not recirculated to the quench pot 22 via line 24 is passed through line 34 to a steam generator (not shown) for the generation of steam for the reformer 14. The effluent from the cooler 32 is at ambient temperature and is introduced through line 36 into a hydrogen PSA unit 38.

Although fewer or greater adsorption beds can be utilized, it is preferred in the practice of the present invention that the hydrogen PSA unit 38 contain four adsorption beds. Each adsorber bed therein will sequentially undergo a cycle comprising:

(1) pressurization with pure hydrogen product;
(2) constant feed and hydrogen product release;
(3) pressure equalization to transfer high pressure hydrogen-rich void gas to another bed at low pressure, the other bed being about to commence product pressurization;
(4) depressurization to slightly above atmospheric pressure;
(5) purge using product hydrogen; and
(6) pressure equalization with another bed at higher pressure to accept hydrogen-rich void gas.

A second pressure equalization may optimally be included between steps (3) and (4) to obtain gas for subsequent use as purge. The hydrogen product, which is at least 99.999 percent pure, is withdrawn through line 40 to a storage vessel (not shown).

The gas withdrawn from the adsorption beds of the hydrogen PSA unit 38 during depressurization and purge, steps (4) and (5) above, is termed the hydrogen purge gas. The hydrogen purge gas is withdrawn through line 42 and, typically, collected in a storage vessel, not shown. It is generally comprised of about 50 percent of carbon dioxide, about 40 percent of hydrogen and about 5 percent each of methane and carbon monoxide.

The hydrogen purge gas is dried in driers (not shown) and compressed to a suitable pressure, e.g. from about 25 to 90 psia, preferably about 50 psia, in compressor 44, withdrawn in line 46 and introduced into a carbon dioxide PSA unit 48 through line 50 in combination with recycle feeds as will be discussed hereafter. Typically, the carbon dioxide PSA unit 48 will contain two or three adsorbent beds, although a higher number can be utilized. The complete operational cycle for the carbon dioxide PSA unit 48 will be discussed with reference to FIG. 2.

The carbon dioxide PSA unit 48 provides a carbon dioxide-rich product stream which is withdrawn through line 52, which is at least 98 percent pure, a carbon dioxide-rich recycle stream which is withdrawn through line 54 and combined with the feed stream in line 50, and a hydrogen-rich product stream which is withdrawn through line 56. The hydrogen-rich product stream is utilized to regenerate the driers associated with the compressor 44 and is thereafter compressed in compressor 58 to a pressure just above the steam reformer feed pressure and recycled to the reformer 14 via line 60 wherein it is combined with the feed to the reformer The steam flow into the steam reformer 14 is optimized for the combined fresh and recycle feeds. Typically, this entails slightly increasing the steam flow to maintain the reforming reaction, which is reversible, in the direction of the hydrogen production. Since the recycle stream 60 is predominately hydrogen, the carbon conversion load in the reformer 14 and the loading in the shift converter 28 and the PSA hydrogen unit 38 are not affected to a significant degree by the presence of the recycle. This is an important consideration for it enables the apparatus necessary to carry out the process of this invention to be retrofitted onto an existing steam reformer hydrogen plant.

The product carbon dioxide stream withdrawn from the PSA unit 48 through line 52 is compressed in a multistage compressor, 62 and 64, to a pressure of from about 220 and 400 psia. The multistage compressor is represented as two separate units, 62 and 64, to illustrate that a portion of the product flow is withdrawn from an intermediate point in the compressor and returned under pressure in line 66 as will be discussed with regard to FIG. 2. The majority of the carbon dioxide product is cooled and partially condensed in heat exchanger 68 and admitted to a distillation column 70. Pure liquid carbon dioxide is withdrawn from the bottom of column 70 through line 72 to a storage tank (not shown). The liquid carbon dioxide withdrawn through line 72 is at least 99.9 percent pure. Refrigeration for the distillation column is provided through an external refrigeration loop 74 which may be any conventional type, but preferably is an ammonia absorption cycle. Ammonia absorption refrigeration is preferred since it requires low level heat which is readily obtained by recovering a portion of the steam reformer waste heat. This process integration enhances the overall efficiency of the subject process significantly.

An impurity stream comprised of carbon dioxide, hydrogen and small amounts of methane and carbon monoxide is withdrawn from the top of distillation column 70, warmed in a heat exchanger 76 to recover cooling energy and recycled through line 78 under the control of valve 80 to be combined with the feed in line 50 to the carbon dioxide PSA unit 48. Heat exchangers 68 and 76 are in counter-current flow with the refrigeration loop 74 which enhances the efficiency of the carbon dioxide liquefaction. Integration of the carbon dioxide bulk separation system and the distillation final purification system in accordance with the subject process permits the impurity stream from the distillation column 70 to be recycled instead of being vented, thereby further increasing the efficiency of the process.

Figure 2:
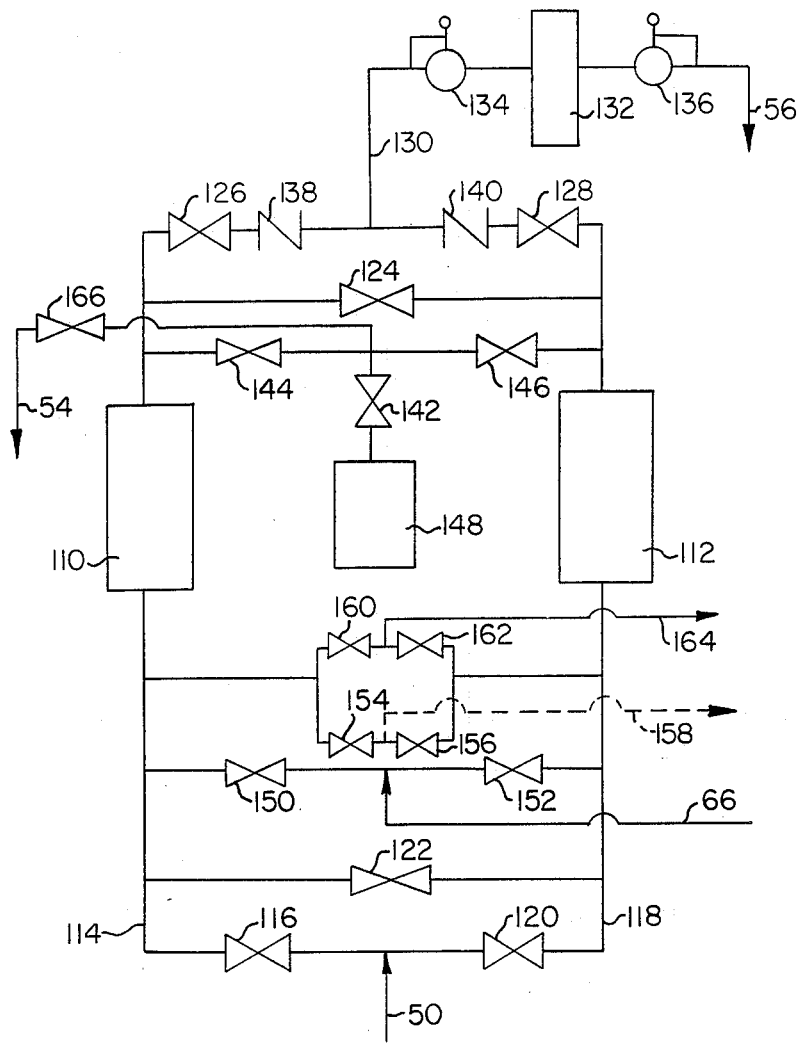
FIG. 2 is a schematic diagram of the carbon dioxide PSA unit of the present invention.

The operation of the carbon dioxide PSA unit will be apparent by reference to FIG. 2 wherein it is illustrated in a two-bed configuration. Lines in FIG. 2 corresponding to lines in FIG. 1 carry the same designations. Feed gas under pressure enters the unit through line 50, reference FIG. 1. The feed gas is conducted to adsorbent bed 110 or 112 through lines 114 or 118 by the opening and closing of valves 116 and 120, respectively. Balance between beds 110 and 112 for top and bottom bed equalization is controlled through valves 122 and 124. Once a bed to undergo adsorption is pressurized with feed gas, valve 126 or 128 is opened and hydrogen-rich product is withdrawn through line 130 into product surge tank 132. The pressure in tank 132 is regulated by back pressure control 134 and forward pressure control 136, and check valves 138 and 140. Hydrogen-rich product is withdrawn from the high pressure surge tank 132 through line 56 for recycle through compressor 58 as shown in FIG. 1. Following release of hydrogen-rich product, the beds are depressurized and equalized to an intermediate pressure by opening valves 122 and 124.

The bed which has been in adsorption is then further depressurized through the product end by opening valve 142 and the appropriate of valves 144 and 146, so that gas will flow into equalization tank 148. After the flow into the equalization tank 148 has taken place, the appropriate of valves 150 and 152 is opened and recycle purge is admitted into the bed from line 66. The recycle carbon dioxide-rich stream is withdrawn from an intermediate point in compressor 62/64 such that it is under a pressure higher than the feed pressure of the carbon dioxide PSA unit 48. The significant advantage, in addition to a marked degree of process control, provided by this unique step is that it drives components of the gas mixture less strongly adsorbed than carbon dioxide, i.e. hydrogen, carbon monoxide and methane, out of the bed and replaces them with more strongly adsorbed carbon dioxide. This, in turn, significantly increases ultimate product purity since there is a more complete displacement of the less strongly adsorbed material. The displaced gas mixture is released through the appropriate of valves 144 and 146, and valve 166 to flow into line 54 for recycle. The equalization tank 148 may optionally be opened to receive cocurrent purge by keeping valve 142 open during purge.

Following cocurrent pressurized carbon dioxide purge, the appropriate of valves 144 and 146 is closed and of valves 154 and 156 opened to vent carbon dioxide-rich product through line 158. When the bed pressure approaches atmospheric, the appropriate of valves 160 and 162 is opened and product withdrawal is continued through line 164 with the aid of vacuum means (not shown). Lines 160 and 166 are combined to form line 52, reference FIG. 1. Although the dual line configuration shown in FIG. 2 is preferred, venting and vacuum evacuation may be carried out through a single line.

Following production of carbon dioxide-rich product, the pressure in the beds is again equalized by top and bottom equalization by opening valves 122 and 124. Valves 122 and 124 are then closed and the bed, which had undergone carbon dioxide production, is further repressurized by the opening of the appropriate of valves 144 and 146 as well as valve 142 to allow gas to flow back from the equalization tank 148. As is apparent from FIG. 1, the flow in line 54 is recycled into the feed for the unit.

A typical cycle of operation for the two-bed $CO_2$ PSA unit shown in FIG. 2 is given in Table I. Bed A and Bed B can refer to beds 110 and 112 in FIG. 2. As an optional step, partial repressurization of the beds with hydrogen-rich product back-fill from surge tank 132 can precede pressurization of the bed with feed gas.

TABLE I

| | $CO_2$ PSA CYCLE SEQUENCE | |
|---|---|---|
| Step | Bed A | Bed B |
| 1. | Bed Pressure Equalization | |
| 2. | Depressurization into Equalization Tank | Feed Pressurization |
| 3. | Cocurrent Purge with $CO_2$-Rich Gas | Feed Pressurization + $H_2$-Rich Production |
| 4. | Countercurrent Depressurization | $H_2$-Rich Production |
| 5. | Vacuum Regeneration | $H_2$-Rich Production |
| 6. | Pressurization from Equilization Tank | $H_2$-Rich Production |
| 7. | Bed Pressure Equalization | |
| 8. | Feed Pressurization | Depressurization into Equalization Tank |
| 9. | Feed Pressurization + $H_2$-Rich Production | Cocurrent Purge with $CO_2$-Rich gas |
| 10. | $H_2$-Rich Production | Countercurrent Depressurization |
| 11. | $H_2$-Rich Production | Vacuum Regeneration |
| 12. | $H_2$-Rich Production | Pressurization from Equilization Tank |

The carbon dioxide-rich product is collected from Bed A during steps 4 and 5, and from Bed B during steps 10 and 11.

The process of this invention provides a significant improvement over processes heretofore practiced in a number of respects. The subject process produces high purity, i.e. merchant grade, gaseous hydrogen and food grade liquid carbon dioxide at lower cost than previous processes due to significantly reduced loss of product as a result of the integration of the two PSA units and the recycling of hydrogen-rich and carbon dioxide-rich streams into the process. The conversion of the carbon content of the hydrocarbon feed to the steam reformer to carbon dioxide is virtually 100 percent. The subject process is also advantageous in that the recycle of product carbon dioxide under pressure preferably above that of the carbon dioxide PSA unit increases the purity of the carbon dioxide product received in the distillation column for liquification. Further, the subject process is advantageous in that it can be conveniently retrofitted onto an existing steam reformer plant, even one having a hydrogen PSA unit associated therewith.

The invention has been described with reference to preferred embodiments thereof. It will be appreciated by those skilled in the art that various modifications may be made from the specific details given without departing from the spirit and scope of the invention.

We claim:

1. A process of recovering high purity gaseous hydrogen and liquid carbon dioxide comprising:
   (a) generating hydrogen from one or more hydrocarbons in a steam reformer;
   (b) treating the steam reformer effluent in a shift converter to convert carbon monoxide therein to carbon dioxide;
   (c) introducing the shift converter effluent into a hydrogen PSA unit thereby recovering gaseous hydrogen of at least 99.999 percent purity and an effluent stream comprising hydrogen, carbon dioxide, carbon monoxide and methane;
   (d) introducing the hydrogen PSA unit effluent stream at a pressure not exceeding 90 psia into a carbon dioxide PSA unit thereby producing a hydrogen-rich stream, a carbon dioxide-rich recycle stream and a carbon dioxide-rich product stream comprising at least 98 percent pure carbon dioxide;
   (e) recycling the hydrogen-rich stream to the feed to the steam reformer and concurrently optimizing the steam flow for the combined fresh and recycle feeds in order to increase generation of hydrogen in the reformer and thereby hydrogen production in the hydrogen PSA unit;
   (f) recycling the carbon dioxide-rich stream to the feed to the carbon dioxide PSA unit;
   (g) passing the carbon dioxide-rich product stream to a means of increasing pressure and thereafter to a means to liquify same under refrigeration and recovering therefrom a high purity liquid product and a waste stream;
   (h) recycling the waste stream from said liquifying means to the feed to the carbon dioxide PSA unit; and
   (i) withdrawing a portion of the high purity carbon dioxide from an intermediate point of said means of increasing pressure and recycling it to the carbon dioxide PSA unit;
   wherein said carbon dioxide pressure swing adsorption (PSA) unit contains at least two adsorbent beds and each adsorbent bed undergoes a cycle comprising pressurization with production of a hydrogen-rich stream, pressure equalization with another adsorbent bed, regeneration to produce a carbon dioxide-rich stream and pressure equalization with another bed, and said recycle stream under pressure in step (i) is utilized as a cocurrent purge to remove from the bed, components of the hydrogen PSA unit effluent that are less strongly adsorbed than carbon dioxide, thereby increasing the amount of carbon dioxide adsorbed in said bed, the purge being carried out prior to regeneration of said bed; and
   wherein, the production of high purity gaseous hydrogen is significantly improved at a low cost and there is substantially 100 percent conversion of the carbon content of the hydrocarbon feed to the steam reformer into carbon dioxide.

2. A process in accordance with claim 1, wherein the hydrogen PSA effluent stream is passed through a drier prior to introduction into the carbon dioxide PSA unit.

3. A process in accordance with claim 1, wherein the portion of the carbon dioxide-rich product stream recycled to the carbon dioxide PSA unit is at a higher pressure than the operating pressure of said unit.

4. A process in accordance with claim 1, wherein the hydrogen-rich stream formed in the carbon dioxide PSA unit is introduced into the steam reformer under pressure.

5. A process in accordance with claim 1, wherein the refrigeration for liquefaction of the carbon dioxide-rich product stream is produced by an ammonia-absorption refrigeration loop.

6. A process in accordance with claim 5, wherein the waste stream formed in the liquifying means is warmed in a heat exchanger flow against said loop to recover refrigeration prior to being recycled to the carbon dioxide PSA unit.

7. A process in accordance with claim 5, wherein the carbon dioxide-rich product stream is passed in countercurrent heat exchange with said loop prior to introduction into said liquifying means 8. A process in accordance with claim 5, wherein the heat requirement for said ammonia-absorption refrigeration loop is obtained by receiving waste heat from said steam reformer.

9. A process in accordance with claim 1, wherein the hydrocarbon is methane.

* * * * *